Feb. 2, 1971 J. S. EATON 3,559,385
SLOPEMOWER APPARATUS FOR HIGHWAY AND RAILROAD RIGHTS-OF-WAY
Filed July 12, 1968 5 Sheets-Sheet 2
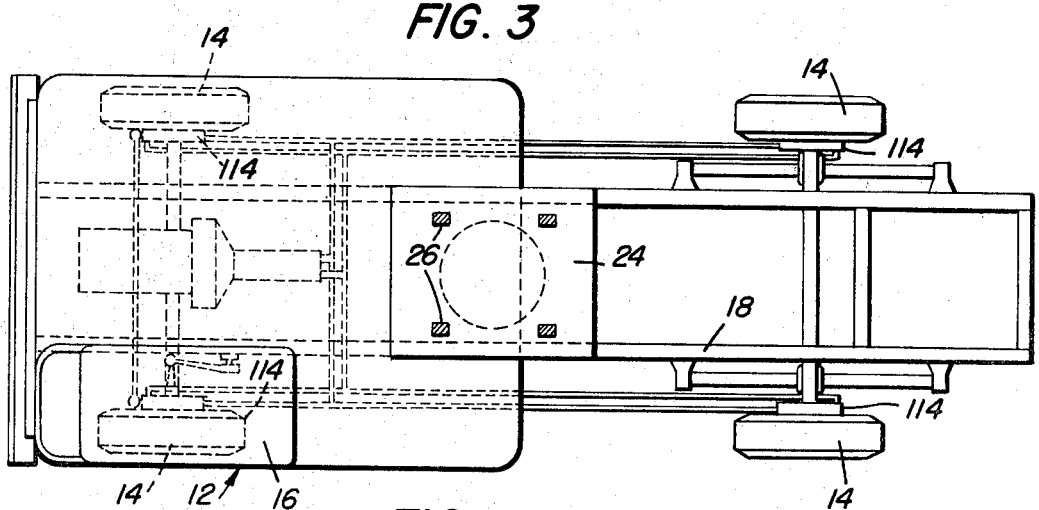
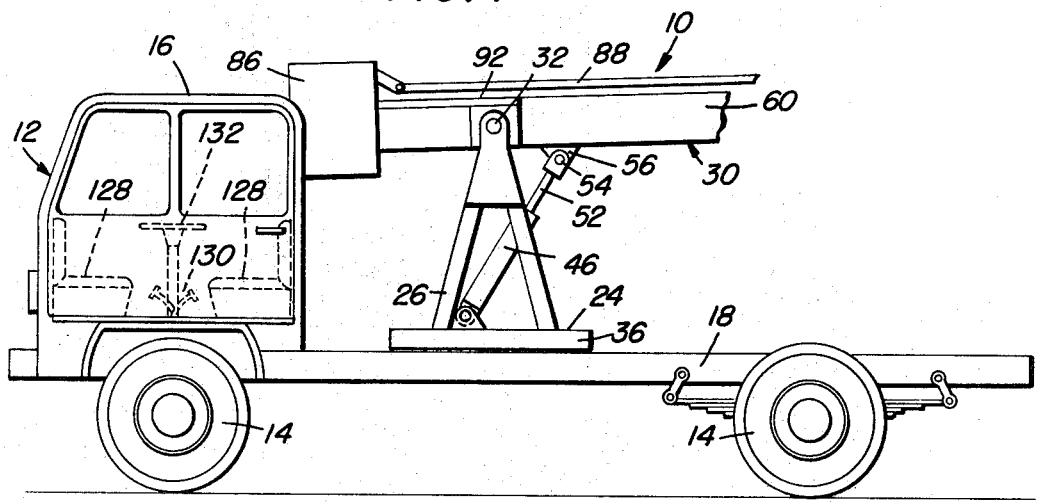
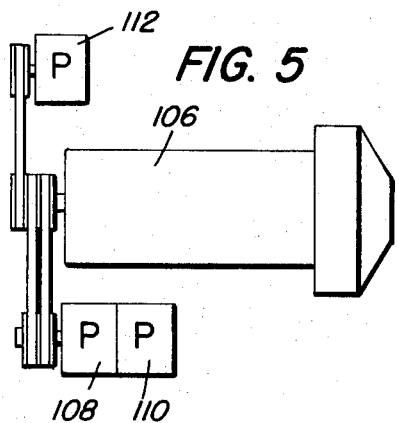
INVENTOR
Jay S. Eaton
BY Gustave Miller
ATTORNEY Feb. 2, 1971  J. S. EATON  3,559,385
SLOPEMOWER APPARATUS FOR HIGHWAY AND RAILROAD RIGHTS-OF-WAY
Filed July 12, 1968  5 Sheets-Sheet 3
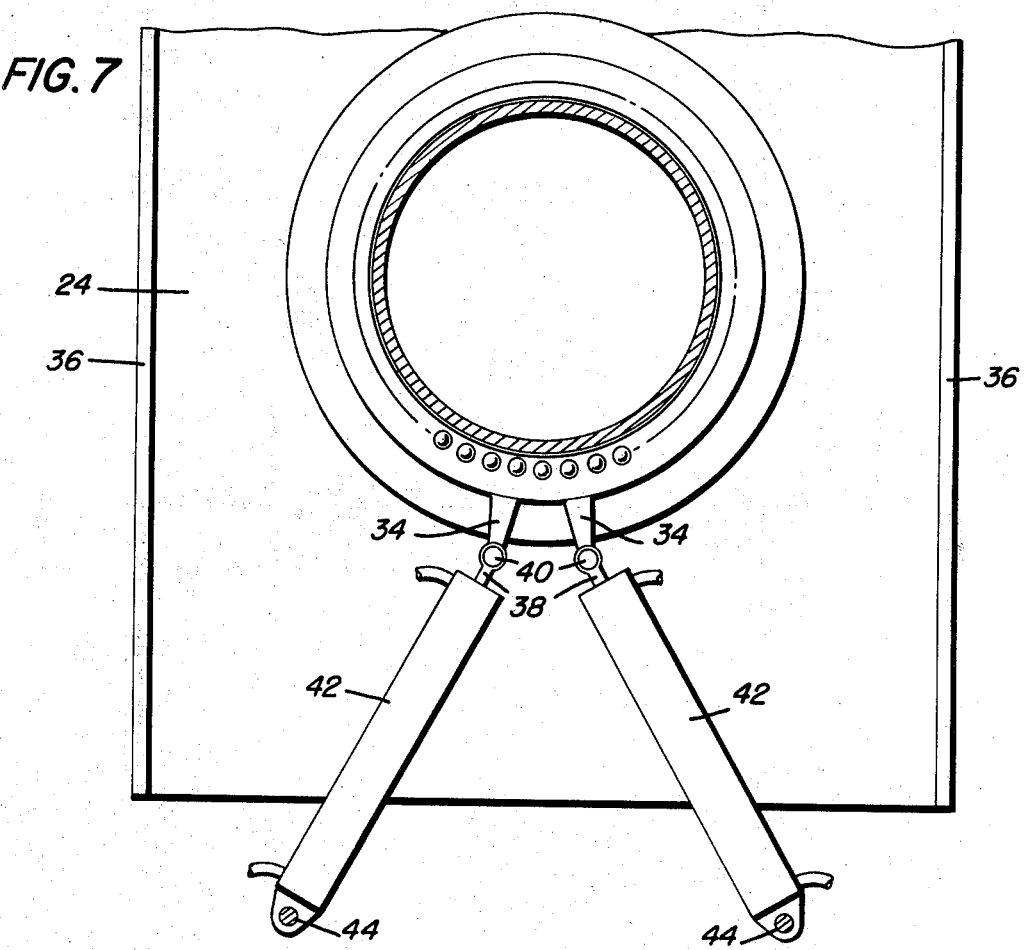
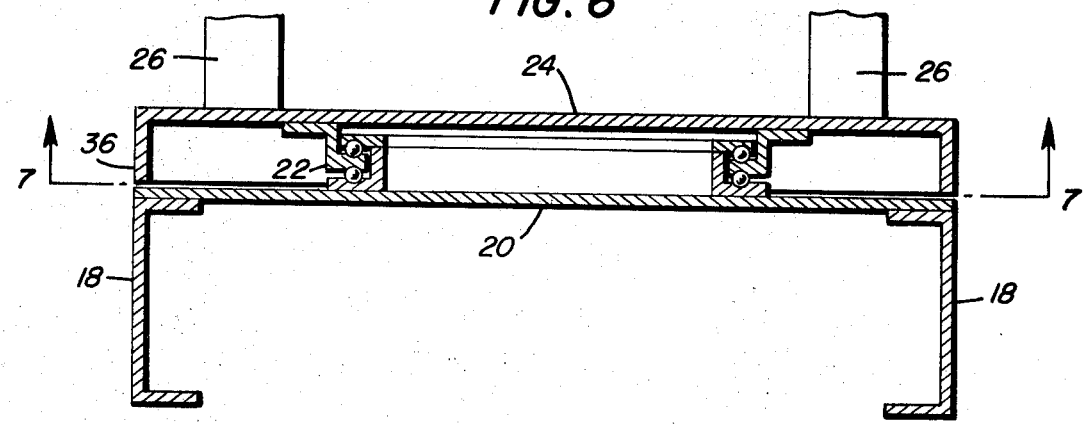
INVENTOR
Jay S. Eaton
BY *Gustave Miller*
ATTORNEY

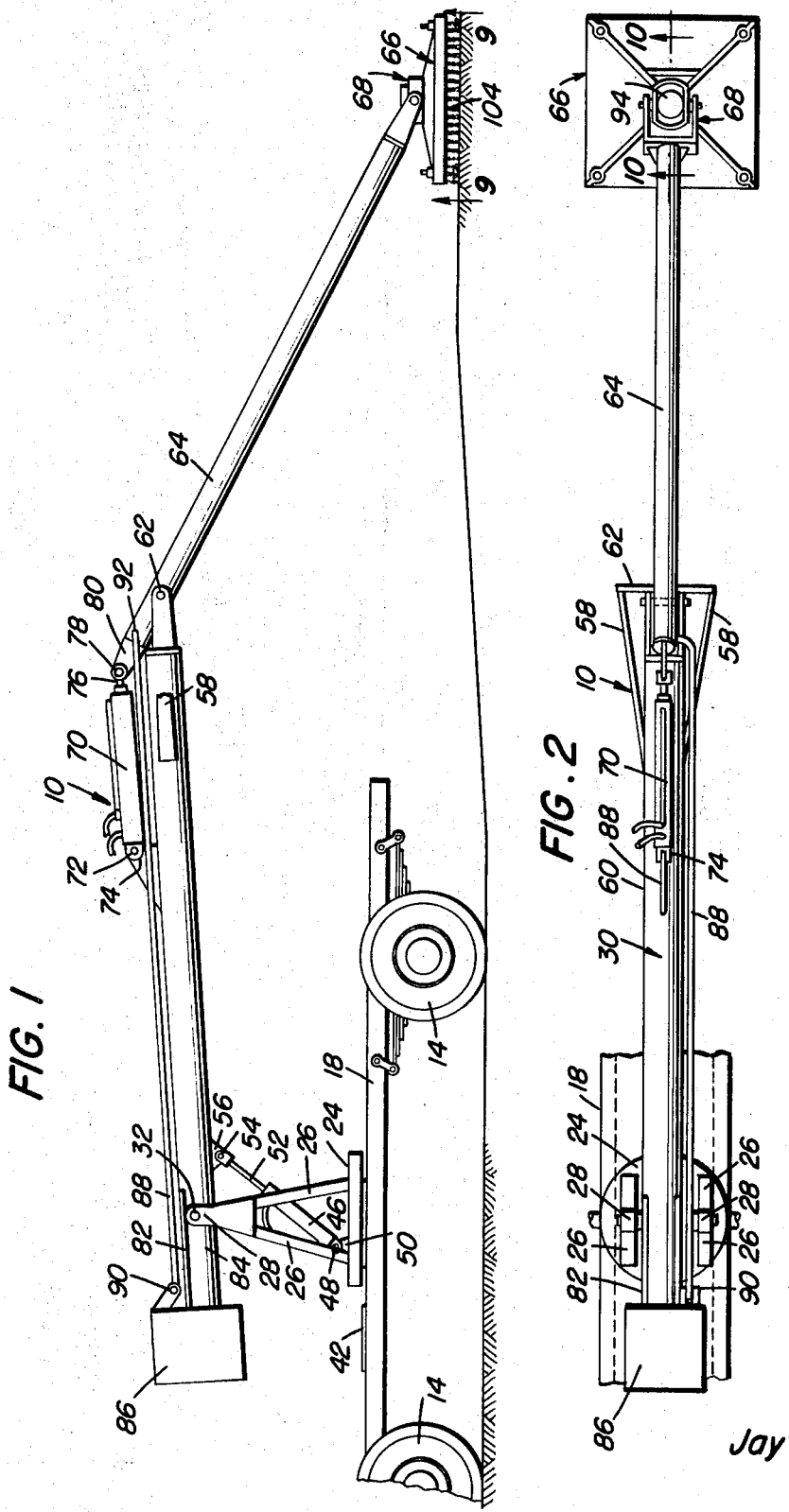

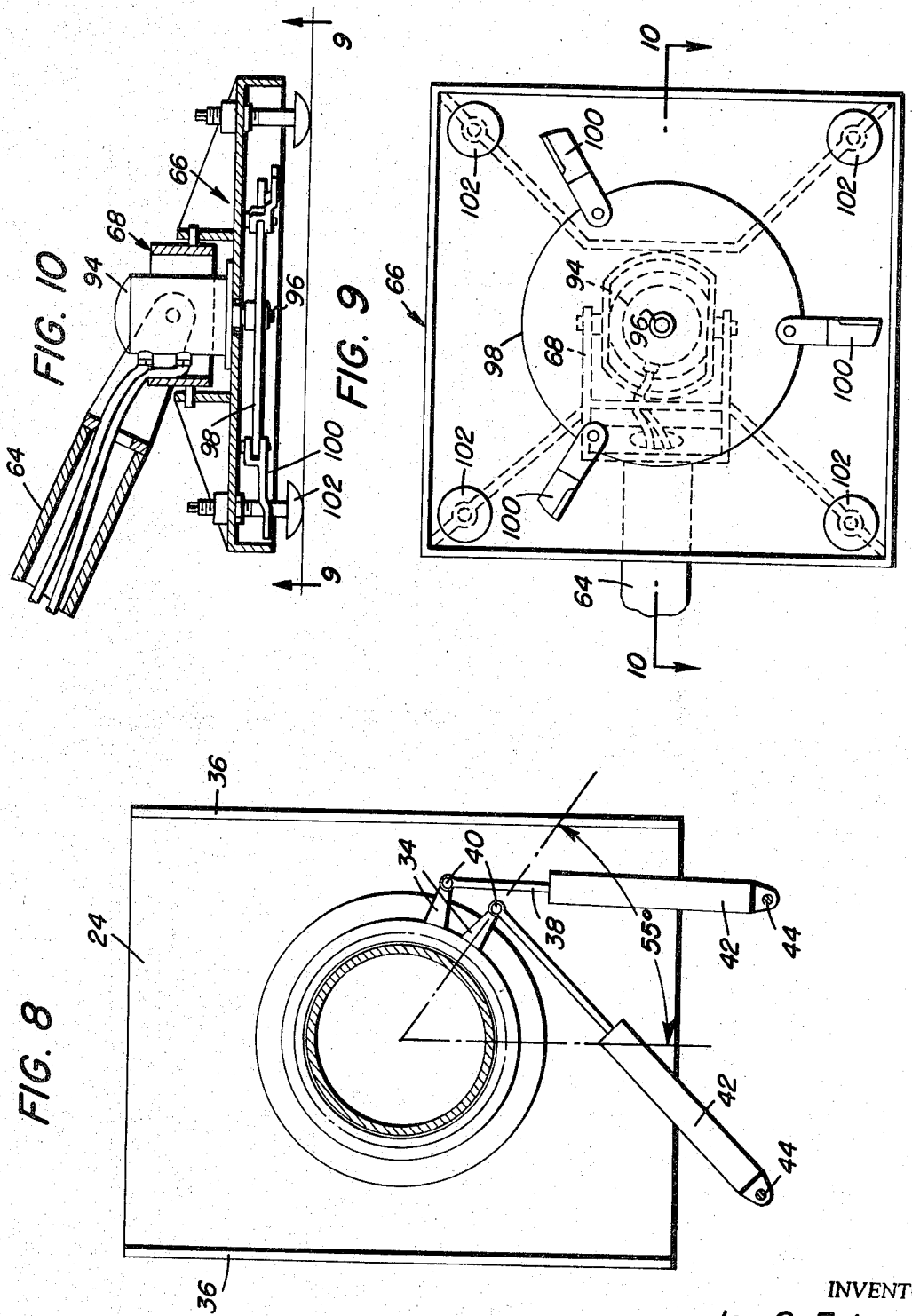

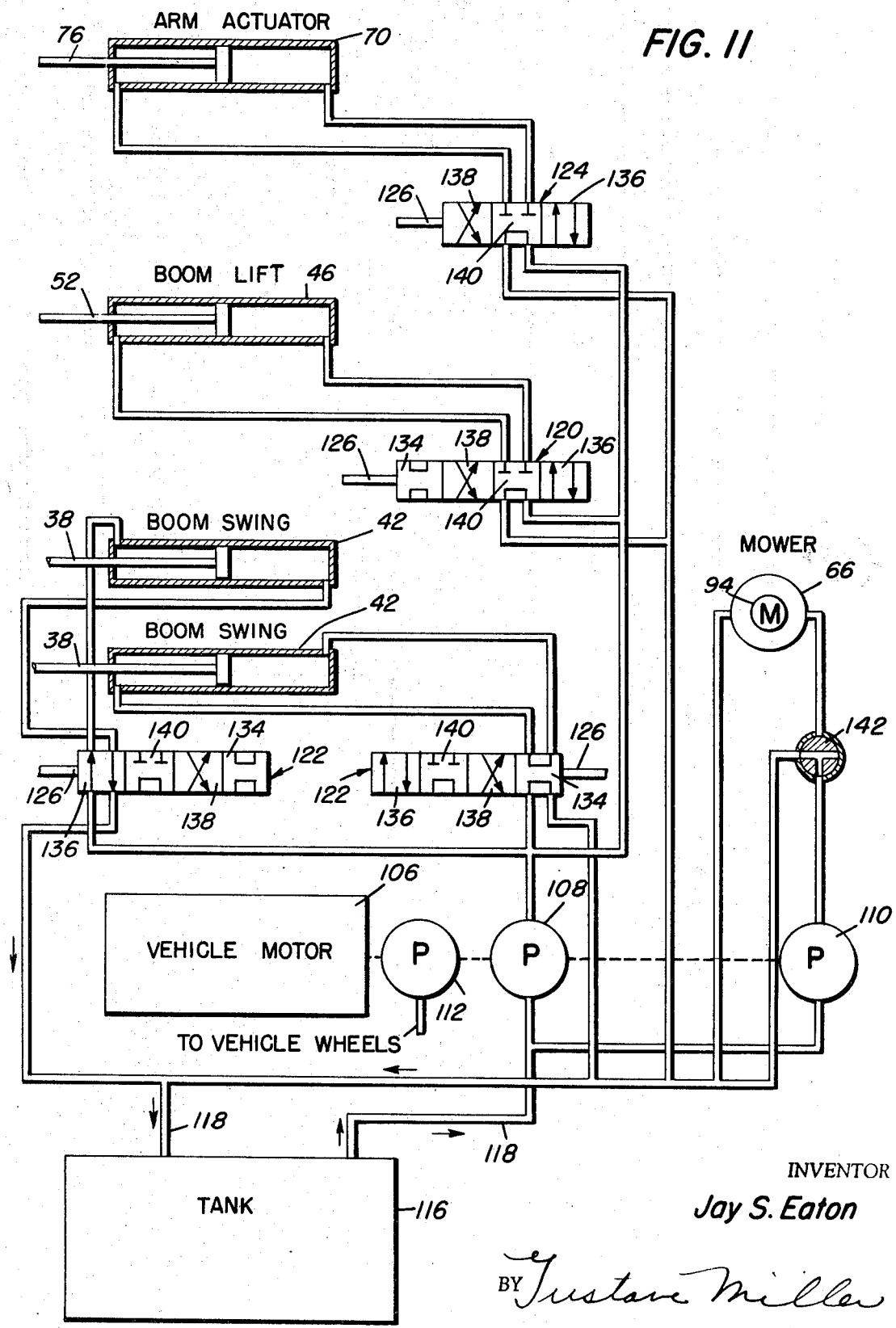

United States Patent Office 3,559,385
Patented Feb. 2, 1971

3,559,385
**SLOPEMOWER APPARATUS FOR HIGHWAY
AND RAILROAD RIGHTS-OF-WAY**
Jay S. Eaton, % Dixie Asphalt Co., P.O. Box 15195,
West Palm Beach, Fla. 33406
Filed July 12, 1968, Ser. No. 744,562
Int. Cl. A01d *35/26*
U.S. Cl. 56—25.4                          11 Claims

ABSTRACT OF THE DISCLOSURE

This invention is a mower for cutting brush, bushes, shrubs, small trees, etc., and for mowing grass on either side or slope of a railroad trackway or the median strip or sides of a motor highway. It includes a small, preferably four wheel powered automobile truck that can travel on either a railroad track or a highway, with a cab offset to one side of the truck and both mower and truck controls in the offset cab for simultaneous or separate operation by a single operator. The operator may operate in either direction, a seat being provided on both forward and rearward sides of the controls. A boom is rotatably mounted for limited rotation on the truck chassis, on a position midway between all four wheels thereof, and an arm pivoted on the boom carries a mower universally mounted on its end, for positioning between a rearward position and a side position on the cab side of the truck, the other end of the boom moving between a position alongside the cab to a position over the opposite side of the truck vehicle, and this end has a counterweight movable on a trackway on the boom end, the counterweight being linked to the mower arm. In addition to the truck controls in the offset cab, there are also hydraulic controls for operating the boom in its limited swinging position, for lifting the boom and pivoting the arm thereon, and provides lifting, locking and lowering controls for each of them, and floating control position for at least one of them as well as for operating the mower. Only one operator is needed for both truck and mower controls.

BACKGROUND OF THIS INVENTION

It is quite a problem to keep the median strip and slope sides of modern highways, freeways, turnpikes, throughways, neat and clean and to maintain the grass and shrubbery, brush, etc. in presentable condition at a minimum expense, the same applying to the sides and slopes of railroad tracks. This problem is one both of beauty and safety to prevent overgrowth that could interfere with safe vision of the traveling public, and expensewise, it is essential to solve this problem at minimum expense, both for equipment and for operating personnel. The basic function of the machine is to achieve very difficult slope mowing which often times is accomplished by hand, and this machine eliminates major costs as its primary usefulness. Accordingly, this invention solves this problem.

OBJECTS OF THE INVENTION

It is an object of this invention to provide mowing and ground working equipment that can maintain the slopes and sides of highways and railroad tracks as well as the median strips of highways in safe and beautiful condition.

A further object of this invention is to provide such equipment at minimum expense, and to keep the operating expense at the minimum by providing that one operator alone can both operate the truck in either direction as well as fully control the mowing equipment simultaneously as needed.

A further object of this invention is to provide a mower apparatus that is comparatively inexpensive, used in combination with a small truck, the truck motor providing power for both operating the truck and for operating all the mower equipment.

Still a further object of this invention is to provide a mower apparatus that can be mounted on a small, preferably four wheel powered truck vehicle, midway between the wheels, with the cab offset to one side and the mower apparatus operable from a rear maximum position to a maximum position on the cab offset side.

Yet a further object of this invention is to provide a mower apparatus that can be mounted on a small truck, that can use power from the small truck motor for powering the entire mower apparatus, eliminating the need for a separate motor as well as the need for an additional operator.

A further object of this invention is to provide hydraulic operation of all the mower equipment, the power therefor coming from the truck vehicle motor, and wherein the vehicle wheels may also be hydraulically powered, with all controls located for convenience by the operator.

BRIEF DESCRIPTION OF FIGURES

With the above and related objects in view, this invention consists in the details of construction and combination of parts, as will be more fully understood from the following description, when read in conjunction with the accompanying drawing, in which:

FIG. 1 is a side elevation of the mower apparatus of this invention, mounted on a truck vehicle.

FIG. 2 is a top plan view of FIG. 1, the vehicle being omitted.

FIG. 3 is a top plan view of the truck vehicle, showing the mower boom base midway between the four wheels.

FIG. 4 is a side view of FIG. 3, of the vehicle, including a fragment of the mower boom.

FIG. 5 is a fragmentary schematic detail, showing the transmission of the power from the vehicle motor to hydraulic pumps for powering the vehicle and also the mower equipment.

FIG. 6 is a transverse section through the vehicle chassis, showing the boom support base rotatably mounted thereon, on an enlarged scale.

FIG. 7 is a bottom view section on lines 7—7 of FIG. 6.

FIG. 8 is a view similar to FIG. 7, on a smaller scale, with the boom base rotated its maximum in one direction.

FIG. 9 is a view on line 9—9 of FIG. 1 and FIG. 10.

FIG. 10 is a section on line 10—10 of FIG. 2 and FIG. 9.

FIG. 11 is a schematic view of the hydraulic power circuit from the vehicle motor to the wheels and to all the mower equipment.

DETAILED DESCRIPTION OF INVENTION

There is shown at 10 the mower equipment of this invention installed on a vehicle truck 12 midway between the four wheels 14 thereof, the vehicle 12 being preferably a four wheel power vehicle, and also, the power may be hydraulically transmitted to the vehicle wheels 14, as well as to all operating parts of the mower equipment, the term "mower" referring to any ground working apparatus that will work the surface of the ground, particularly for cutting grass, shrubbery, brush, bushes, small trees, etc., such as is normally used affecting the contour of the ground and of any vegetation growing thereon such as is normally found on the sides and median strips of motor highways and on railroad rights of way, and which often extend a substantial distance from the traveled portion of the right of way. The wheels 14 may be either automobile wheels or railroad wheels, or combination automobile and railroad track wheels, which are all well known and therefore are not shown in the drawings.

The truck vehicle 12 has its cab 16 offset to one side of the chassis 18, as particularly seen in FIG. 3, thereby providing room for a rotatable boom support base 20 to be mounted on the chassis 18 substantially midway between all four wheels 14. Rotatably mounted on base 20 by interengaging bearing journals 22 is a flanged support plate 24 from which slanted stanchions 26 extend to support trunnions 28 between which a boom 30 is pivotably secured on a pivot pin 32. The boom 30 can be rotated or swung through approximately a right angle, between a position extending to the maximum rear to a position extending to maximum at right angles to the chassis 18 on the offset cab side of the chassis 18. However, to provide for the fact that sometimes the vehicle may not be able to be placed so that such maximum positions will always reach the desired operating position, as when the vehicle 12 may be at a slight angle to the direction of the road, or going around a curve, the approximate right angle that the boom may swing is actually about 110°, which is ample for such irregular placing of the vehicle 12. This limited but controllable swinging of the boom 30 is provided by providing a pair of spaced apart pivot fingers 34 on the flange 36 of the flanged support plate. Piston connecting rods 38 pivoted at 40 to the pivot finger 34 extend into hydraulic cylinders 42 which in turn are pivoted at 44 at suitably spaced apart locations on the chassis 18, so that when either cylinder 42 is powered, and the other cylinder 42 is placed in floating position, as will later be detailed, each connecting rod may swing the boom approximately through 60°, there being approximately a 10° overlap, more or less, and there is no dead center position, as apparent in FIG. 7, where it is apparent that either cylinder 42 can operate its connecting rod in a pushing direction to swing the boom.

A boom lifting, lowering, holding and floating cylinder 46 is pivoted at 48 to boss 50 on flanged support plate 24 beneath the trunnions 28, and its piston connecting rod 52 is pivoted at 54 to a boss 56 on the bottom of boom 30. Pivoted between fingers 58 extending from a longer portion 60 of the boom 30 over the rear end of the vehicle 12 on a pivot 62 is a mower carrying arm 64, at the end of which is the mower 66 mounted thereon by a universal joint 68.

An arm actuator hydraulic cylinder 70 is pivoted at 72 to a boss 74 mounted on the top of long portion 60 of boom 30, and its piston connecting rod 76 is pivoted at 78 to the end 80 of arm 64, such end 80 extending beyond and above the arm pivot 62 through the boom end fingers 58. A counterweight track 82 on top of the short portion 84 of boom 30 provides a path for an inverted U-shaped cast iron counterweight 86 to travel on, such weight 86 being connected by link 88 pivoted at 90 at one end to the weight 86, and at 92 at its other end to the arm 64 between its pivot 62 and its end 80. As will be apparent, the link 88 will cause the weight 86 to move and compensate for the change in the movement of force of the arm 64 as its angle to the boom 30 is changed.

The mower 66 carries a hydraulic motor 94 whose shaft 96 has a circular cutter support plate 98 on which are pivoted a plurality of cutter blades 100, swung out and yieldably maintained in cutter position by centrifugal force. Ground engaging mushroom castors 102 are adjustable to maintain the cutter blades 100 at the optimum position, and a curtain guard 104 is provided around the mower 66 to prevent flying of stones or other objects that may be struck by the blades 100. Obviously, castor wheels could be used in place of mushroom castors.

Hydraulic power pressure for operating the boom 30, the arm 64 and mower 66 is provided by the vehicle motor 106 which operates hydraulic pump 108 for the boom 30 for the arm 64, pump 110 for the mower motor 94. Another pump 112 may be also provided and connected to hydraulic motors 114 on each of the wheels 14, although, if desired, the usual mechanical power propeller shaft mechanism may be used.

As shown diagrammatically in FIG. 11, hydraulic fluid is circulated by the pumps 108, 110 and 112 from a reservoir tank 116 by suitable hydraulic pressure lines 118 to each of the hydraulic cylinders 42, 42, 46 and 70 through boom lift control valve 120, and boom swing control valves 122, each of which is identical, and arm actuator control valve 124, which is slightly different. Operating rods 126 for each of these valves 120, 122, 122 and 124 terminate in the cab 16 and are controlled by an operator in the cab 16 who may sit in either cab seat 128 within which the vehicle control double pedals 130 are provided for operation from either seat 128, the steering wheel 132 being located between the seats 128. As shown in FIG. 11, valves 120, 122 and 122 each have four control positions, a float position at 134, two opposite direction power positions at 136 and 138, and a lock or holding position at 140. Only the two opposite power positions 136 and 138 and the holding position 140 is present in the arm actuator valve 124.

OPERATION OF INVENTION

In operation, the vehicle operator occupies the appropriate seat 128, depending on whether he is operating the vehicle at high speed over the highway or railroad, or at low speed while he is actuating the mower 66, positioning it by swinging the boom 30 back and forth or holding the boom 30 in position. He will place one of the boom swing control valves 122 in float position 134 and operate the other boom control valve 122 to either power position 136 or 138 or to the lock or holding position 140. He will also operate the boom lift valve and the arm actuator valves 124 to either of the three positions—the lock position or either power position. He will also operate the mower motor control valve 142 to operate the cutter blades 100. When the mower 66 has its castor mushrooms 102 resting on the ground, the boom lift valve will be placed in float position 134, letting the mower follow the contour of the ground as it operates. He may operate either boom swing valve 122 while the other swing valve 122 is in float position, to move the mower from behind the vehicle 12 to the cab side of the vehicle 12 at right angles thereto, the short portion 84 of the boom 30 moving from a position alongside the cab 16 to a right angle position over the side opposite the cab side. The cab 16 is offset on one side of the vehicle so as to make room for the movement of the boom 30, and occupies only one-third of the width of the vehicle 12, as only one person will occupy it at a time. By providing interchangeable rubber and rail wheels, the same vehicle may be used either on a highway or a railroad, such interchangeable wheels being well known. By lowering the boom 30 and arm 64, the maximum distance can be reached, and by adjusting the boom 30 and arm 64 appropriately, the entire area from the maximum distance to alongside the vehicle 12 can be covered. When traveling on the highway, and not in mowing operation, the boom and arm may be manipulated to rest the mower on the rear of the vehicle, and then the vehicle may travel at usual highway or railroad speeds.

ABSTRACT OF DRAWINGS

In the drawings, like numbers refer to like parts, and for the purposes of explication, marshalled below are the numbered parts of the improved mower apparatus for highway and railroad rights-of-way:

10 mower apparatus
12 truck vehicle
14 railroad or automobile truck wheels

| # | Description |
|---|---|
| 16 | offset cab |
| 18 | chassis |
| 20 | boom support base |
| 22 | interengaging bearing journals |
| 24 | flanged boom support plate |
| 26 | slanted stanchions |
| 28 | trunnions |
| 30 | boom |
| 32 | boom pivot pin |
| 34 | pivot fingers on flange 36 |
| 36 | flange of plate 24 |
| 38 | piston connecting rod |
| 40 | pivot of connecting rod 38 |
| 42 | boom swing hydraulic cylinders |
| 44 | pivot of cylinder 42 on chassis 18 |
| 46 | boom lift hydraulic cylinder |
| 48 | pivot of cylinder 46 on boss 50 |
| 50 | boss on chassis beneath trunnions 28 |
| 52 | piston connecting rod of cylinder 46 |
| 54 | pivot of rod 52 on boss 56 |
| 56 | boss on bottom of boom 30 |
| 58 | pivot fingers at end of long boom portion 60 |
| 60 | long portion of boom 30 |
| 62 | pivot through fingers 58 for arm 64 |
| 64 | mower carrying arm |
| 66 | mower |
| 68 | universal joint for mower 66 on arm 64 |
| 70 | arm actuator hydraulic cylinder |
| 72 | pivot of cylinder 70 on boss 74 |
| 74 | boss on top of long boom portion |
| 76 | piston connecting rod to mower carrying arm 64 |
| 78 | pivot of rod 76 on end 80 of arm 64 |
| 80 | end of arm 64 |
| 82 | counterweight track |
| 84 | short portion of boom 30 |
| 86 | counterweight |
| 88 | link |
| 90 | pivot 88 to 86 |
| 92 | pivot of 88 to 64 |
| 94 | hydraulic motor for mower 66 |
| 96 | shaft of 94 |
| 98 | circular cutter support plate on 96 |
| 100 | cutter blades |
| 102 | ground engaging castor mushrooms |
| 104 | curtain guard depending from 66 |
| 106 | vehicle motor |
| 108 | pump for boom 30 and arm 64 |
| 110 | pump for mower motor 94 |
| 112 | pump for vehicle wheel motors 114 |
| 114 | hydraulic wheel motors |
| 116 | hydraulic reservoir tank |
| 118 | hydraulic pressure lines |
| 120 | boom lift control valve |
| 122 | boom swing control valve |
| 124 | arm actuator control valve |
| 126 | valve operating rods |
| 128 | two cab seats |
| 130 | vehicle control double pedals |
| 132 | steering wheel |
| 134 | valve float control position |
| 136 | valve power position, one direction |
| 138 | valve power position, opposite direction |
| 140 | valve lock or holding position |
| 142 | valve for mower motor 94 |

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A mower apparatus (10) for highway and railroad rights-of-way in combination with a vehicle (12) having front and rear wheels and a power motor (106) for operating said vehicle (12); the improvement comprising a vehicle cab (16) on said vehicle offset on one side thereof, a boom base (20) mounted on the chassis (18) of said vehicle (12) midway between the front and the rear wheels (14) of said vehicle (12), a boom support (24) rotatably mounted on said base, a boom (30) pivotally (28, 32) supported on said boom support (24) intermediate (30 and 84) but substantially nearer one of the ends of said boom (30) providing a long (60) and a shorter (84) portion of the boom (30), means (46) for lifting, lowering and holding said boom (30), means limitedly (42) rotating said boom support (24) for swinging said boom (30) through approximately a right angle, an arm (64) pivoted (62) on the end of the long portion (60) of said boom (30), operating means (70) for pivoting said arm (64) up and down on said boom (30), a mower (66) universally (68) supported on the free end of said arm (64), motor means (94) for operating said mower (66), said boom (30) being swingable between a position extending approximately to the rear of said vehicle (12) and a position extending approximately at right angles to said vehicle (12) on the offset cab (16) side of said vehicle (12), the shorter end (84) of said boom (30) simultaneously moving from a position alongside said cab (16) to a position extending over the vehicle side opposite said offset cab side, power transmission means (108, 118) from said vehicle power motor (106) to said boom support limited rotating means (42) to said boom lifting, lowering and holding means (46) to said operating means (70) for pivoting said arm (64) on said boom (30) and to said motor means (94) for operating said universally (68) supported mower (66), and power transmission control means (126, 132, 142) located in said offset cab (16) for simultaneously or separately operating (130) said vehicle (12), and for limitedly (122) rotating said boom support (20, 24) for lifting, lowering and holding (120) said boom (30), for lifting, lowering and holding (124) said arm (64) on said boom (30) and for operating (142) said motor means (94) of said mower (66), a counterweight (86) and a counterweight track (82) on said boom short portion (84), and link means (88) connecting said counterweight (86) on said track (82) to said pivoted arm (64) to position said counterweight (86) corresponding to the angle of said arm (64) relative to said boom (30).

2. The combination of claim 1, one of said control means to said boom and to said arm providing a floating position (140).

3. The combination of claim 1, said power transmission control means being hydraulic (116, 108), said boom and said arm operating means being hydraulic cylinders (46, 70) and piston connecting rods (52, 76).

4. The combination of claim 3, said control means for said boom and arm operating means (46, 70) being hydraulic valves (120, 124) providing lifting (136), lowering (138) and holding (140) positions.

5. The combination of claim 4, one of said hydraulic valves to said boom operating means (46) also providing a floating position (134).

6. The combination of claim 1, said offset cab (16) having vehicle control means (130) and operator seat means (128) facing in both forward and rearward directions.

7. The combination of claim 1, said limited boom support swinging means comprising a pair of hydraulic cylinders (42) each having connecting rods (38) pivotably (40) secured (34) to said rotatable boom support (24, 36) at an angle to each other, said cylinders (42) being pivotally secured (44) to said vehicle chassis (18), each connecting rod (38) pushing and pulling said boom support (24, 36) through slightly more than half a right angle and being in floating (134) position through slightly more than half a right angle, one of said connecting rods being placed in a floating position (134) while the other is in a power position (136, 138).

8. The combination of claim 7, said angle between said connecting rods being approximately 55°.

9. The combination of claim 4, said hydraulic control valve (120) for said boom operating means (46) also providing a boom floating position (134).

10. The combination of claim 1, said universally supported mower (66) being free floating to follow the contour of the ground being mowed, ground contact being automatically maintained by said counterweight (86).

11. The combination of claim 1, said universally supported mower (66) being free floating, and ground contacting castor means (102) on said mower angling said mower to ground contour following position.

References Cited

UNITED STATES PATENTS

| | | | |
|---|---|---|---|
| 2,648,940 | 8/1953 | Merkley et al. | 56—25.4 |
| 3,032,956 | 5/1962 | Mullet | 56—25.4 |
| 3,087,296 | 4/1963 | Cowles | 56—25.4 |

LOUIS G. MANCENE, Primary Examiner

J. A. OLIFF, Assistant Examiner